United States Patent [19]

Saund

[11] Patent Number: 5,751,855
[45] Date of Patent: May 12, 1998

[54] METHOD AND APPARATUS FOR DETECTING WHETHER AN ELECTRONIC IMAGE HAS BEEN FAXED

[75] Inventor: Eric Saund, San Carlos, Calif.

[73] Assignee: Xerox Corporation, Stamford, Conn.

[21] Appl. No.: 347,928

[22] Filed: Dec. 1, 1994

[51] Int. Cl.$^6$ .............................. G06K 9/46; G06K 9/66; G06K 7/62; H04N 1/00
[52] U.S. Cl. ........................... 382/224; 382/194; 358/400
[58] Field of Search ...................... 382/224, 194, 382/200, 199, 203, 226, 268, 269; 358/400, 261.1, 430

[56] References Cited

U.S. PATENT DOCUMENTS

| | | | |
|---|---|---|---|
| 4,280,144 | 7/1981 | Bacon | 358/455 |
| 4,680,804 | 7/1987 | Kuzunuki et al. | 382/187 |
| 4,746,978 | 5/1988 | Shimura | 348/384 |
| 5,029,227 | 7/1991 | Kawamura | 382/282 |
| 5,212,741 | 5/1993 | Barski et al. | 382/156 |
| 5,218,649 | 6/1993 | Kundu et al. | 382/180 |
| 5,270,836 | 12/1993 | Kang | 358/459 |
| 5,287,202 | 2/1994 | Kumarappan | 358/440 |
| 5,412,742 | 5/1995 | Takasaki et al. | 382/316 |
| 5,440,408 | 8/1995 | Tomita | 358/468 |
| 5,553,162 | 9/1996 | Gaborski et al. | 382/192 |
| 5,559,530 | 9/1996 | Yamashita et al. | 345/136 |

FOREIGN PATENT DOCUMENTS

| | | |
|---|---|---|
| 56-57187773 | 5/1981 | Japan . |
| 6020095 | 1/1994 | Japan . |

OTHER PUBLICATIONS

European Search Report Dec. 19, 1996 for couinterpart European EPC application 95308693.1.

*Primary Examiner*—Yon Couso
*Assistant Examiner*—Ha Tran Nguyen
*Attorney, Agent, or Firm*—Tracy L. Hurt

[57] ABSTRACT

A method of recognizing the effects of coarse pixel quantization on text represented via raster signals to enable automatic selection between fax and normal modes of optical character recognition. A processor executes instructions stored in a memory to trace the contours of connected components included within a sample image and to count the number of runs one, two, and three pixels in length along the contour. If the sample image includes few runs two pixels in lengths along the contours of its connected components as compared to the number of runs one and three pixels in length, then the sample image has undergone coarse pixel quantization and the processor selects fax mode optical character recognition.

19 Claims, 8 Drawing Sheets

METHOD AND APPARATUS FOR DETECTING WHETHER AN ELECTRONIC IMAGE HAS BEEN FAXED

FIELD OF THE INVENTION

The present invention relates to optical character recognition. In particular, the present invention relates to a method of determining whether a document has undergone coarse pixel quantization and subsequent rescanning to enable automatic selection of fax mode optical character recognition.

BACKGROUND OF THE INVENTION

Raster format is one of a number of data format types used in image processing. All raster formats represent an image as a group of sampled points in two dimensional space. The sampled points are usually referred to as pixels. In other words, raster formats describe images using an imaginary grid populated by pixels. Some raster formats represent chromatic pixels using a group of values for primary chroma, such as red, blue and yellow. Other raster formats describe achromatic pixels via values indicative of a gray scale varying between black and white. Still other raster formats describe achromatic pixels using binary values representing only black and white.

Different input/output devices use different raster formats and provide different image resolution. In other words, the size of pixels can vary between raster data formats and between input/output devices. Some printers are capable of providing 600 dot per inch (dpi) resolution. Scanners can provide resolution of 400 dpi. In contrast, standard resolution for facsimile devices is 100×200 dpi. Thus, facsimile devices use coarse pixel quantization as compared to other input/output devices. The resolution of images that have been faxed is impaired even if they are rescanned and reprinted subsequent to faxing. Artifacts of having passed through a low resolution bottleneck remain; that is to say, image quality is not improved merely by using a larger number of smaller pixels.

Optical character recognition units transform signals in raster or bitmap format into character coded signals such as ASCII. Optical character recognition units do so by recognizing the shape of individual characters, such as letters, numbers, and punctuation, and then generating a signal indicative of a number representing the character recognized. As a result, the deformation of character shape caused by faxing causes difficulties for many optical character recognition units. Some optical character recognition units attempt to deal with this problem by including a fax mode in addition to the normal mode. Unfortunately, selection of fax mode optical character recognition requires human intervention.

SUMMARY OF THE INVENTION

A method of automatically recognizing the effects of coarse pixel quantization on text represented via raster format signals to enable automatic selection between fax and normal modes of optical character recognition will be described. According to the method, the contours of connected components within a sample image represented by raster signals are traced and diagonal runs one, two and three pixels in length along the contour are counted. If the sample image includes few diagonal runs two pixels in length as compared to the number of runs one and three pixels in length, then the sample image has undergone coarse pixel quantization and fax mode optical character recognition is selected to generate character coded signals for the document including the sample image.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION

A. Optical Character Recognition System

Figure 1:
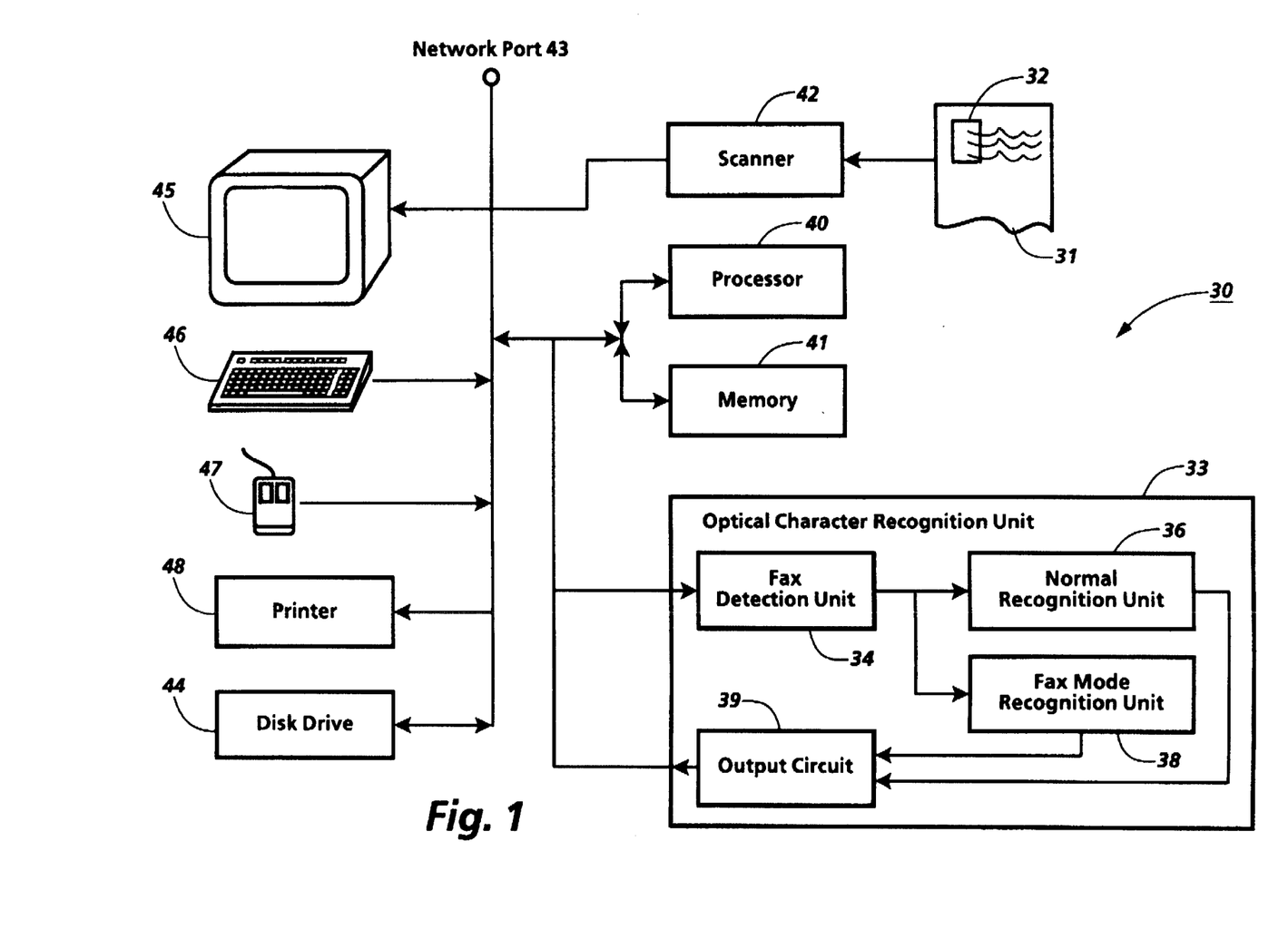
FIG. 1 is a block diagram of a system that identifies documents that have undergone coarse pixel quantization and automatically selects the appropriate mode for optical character recognition unit.

FIG. 1 illustrates document management system 30, which permits documents to be input in a variety of forms, then stored, edited, and converted from bitmap representations to character coded representations such as ASCII. As used herein, character coded signals describe any method of coding and representing the symbols of an alphabet or a language. Optical character recognition unit 33 includes fax detection unit 34 of the present invention, which, as its name suggests, determines whether a document has been faxed. That determination enables fax detection unit 34 to select one of two recognition units 36 or 38 to convert the bitmap representation of document 31 into character coded signals.

Processor 40 may use the character coded signals representing document 31 in a variety of ways. Processor 40 may store the character coded representation of document 31 within memory 41 or on machine readable media input to disk drive 44. Processor 40 may display document 31 on monitor 45, allowing a user to read document 31 or edit document 31 using keyboard 46 or mouse 47. Processor 40 may also generate a hard copy of document 31 by coupling its character coded representation to printer 48. Other uses of the character coded representation of document 31 are also possible.

Processor 40 performs its analysis of the raster signals representing document 31 using instructions stored within memory 41. Memory 41 can be realized using solid state memory devices such as read only memories (ROM), random access memories (RAM), dynamic random access memories (DRAM), programmable read only memories (PROM), erasable programmable read only memories (EPROM), and electrically erasable programmable read only memories (EEPROM), such as flash memories. Alternatively, the instructions for determining whether document 31 has undergone coarse pixel quantization can be stored on machine readable medium input to disk drive 44.

B. Artifacts of Coarse Pixel Quantization

Figure 2A:
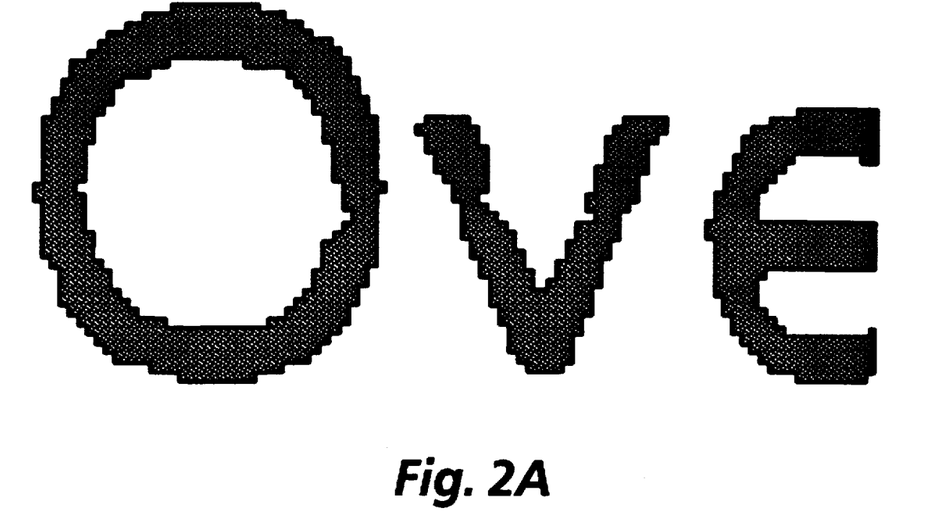
FIG. 2A illustrates a group of characters that were scanned at 400 dpi.
Figure 2B:
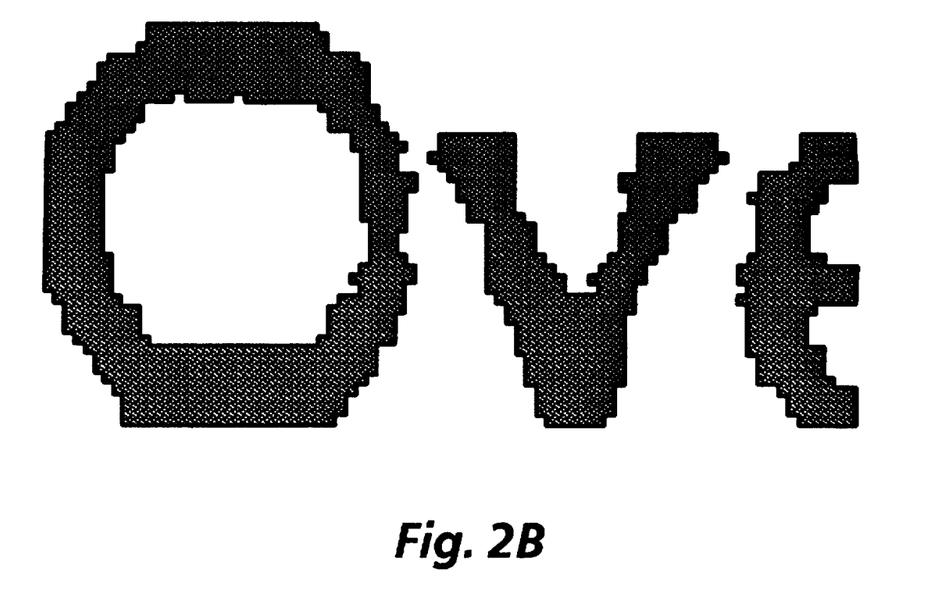
FIG. 2B illustrates the same group of characters that were faxed, then scanned at 400 dpi.

System 30 identifies documents that have undergone coarse pixel quantization by searching for character features that are the artifacts of faxing. Consider FIG. 2A and its companion, FIG. 2B, which both include the letters "Ove." The letters of FIG. 2A were printed, scanned at 400 dpi, magnified by a processor and then printed. While including some jagged edges, the letters of FIG. 2A approximate curves reasonably well. The letters of FIG. 2B were printed, faxed, scanned at 400 dpi, magnified by a processor, and then reprinted. In contrast to FIG. 2A, the letters of FIG. 2B do not approximate curves as well. Note the squareness at the top and bottom of the "O" and the thickness of the "v" in FIG. 2B as compared to their counterparts in FIG. 2A. These are artifacts of coarse pixel quantization—abrupt, jagged representations of diagonals.

Figure 3A:
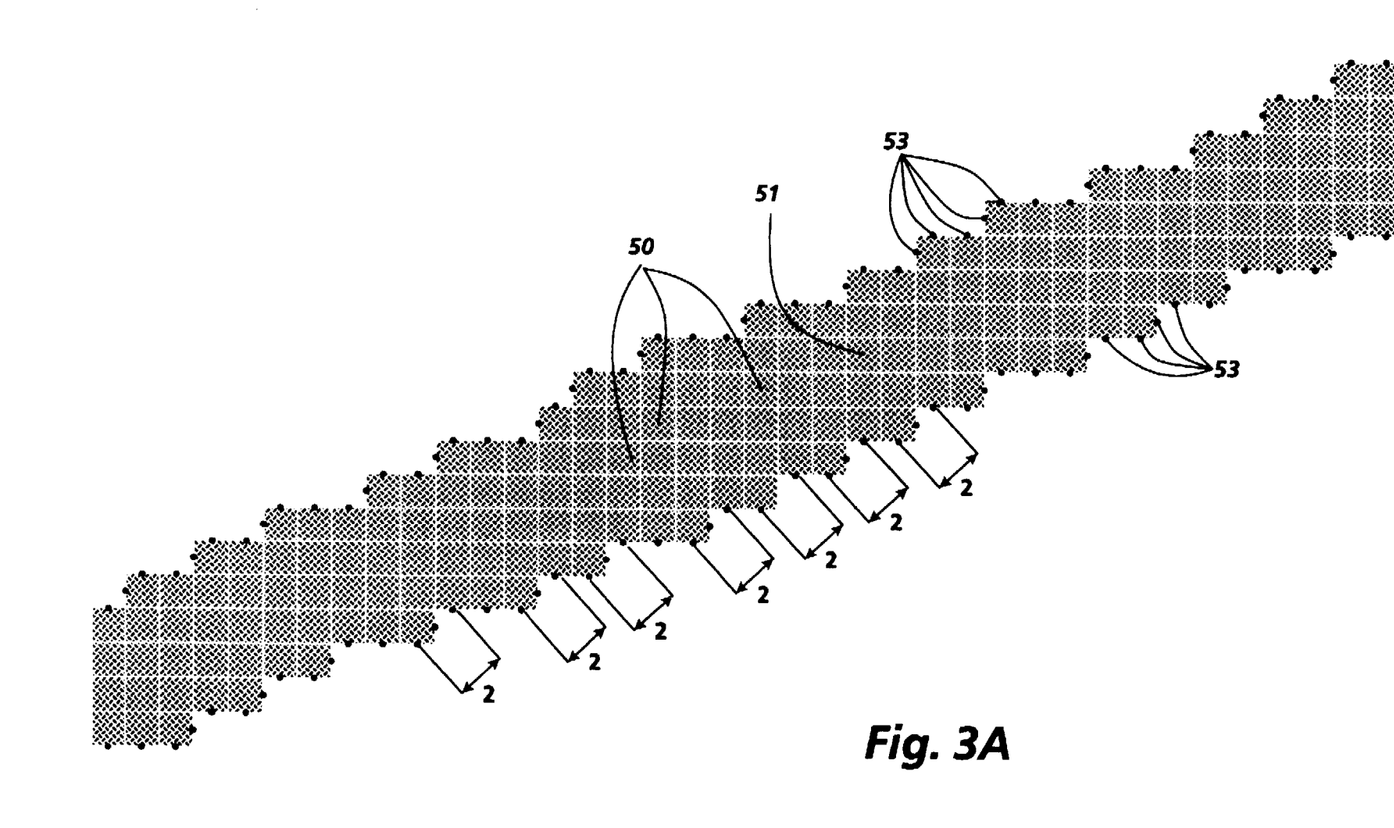
FIG. 3A is a magnified view of a portion of a diagonal line generated by scanning an original document at 400 dpi.
Figure 3B:
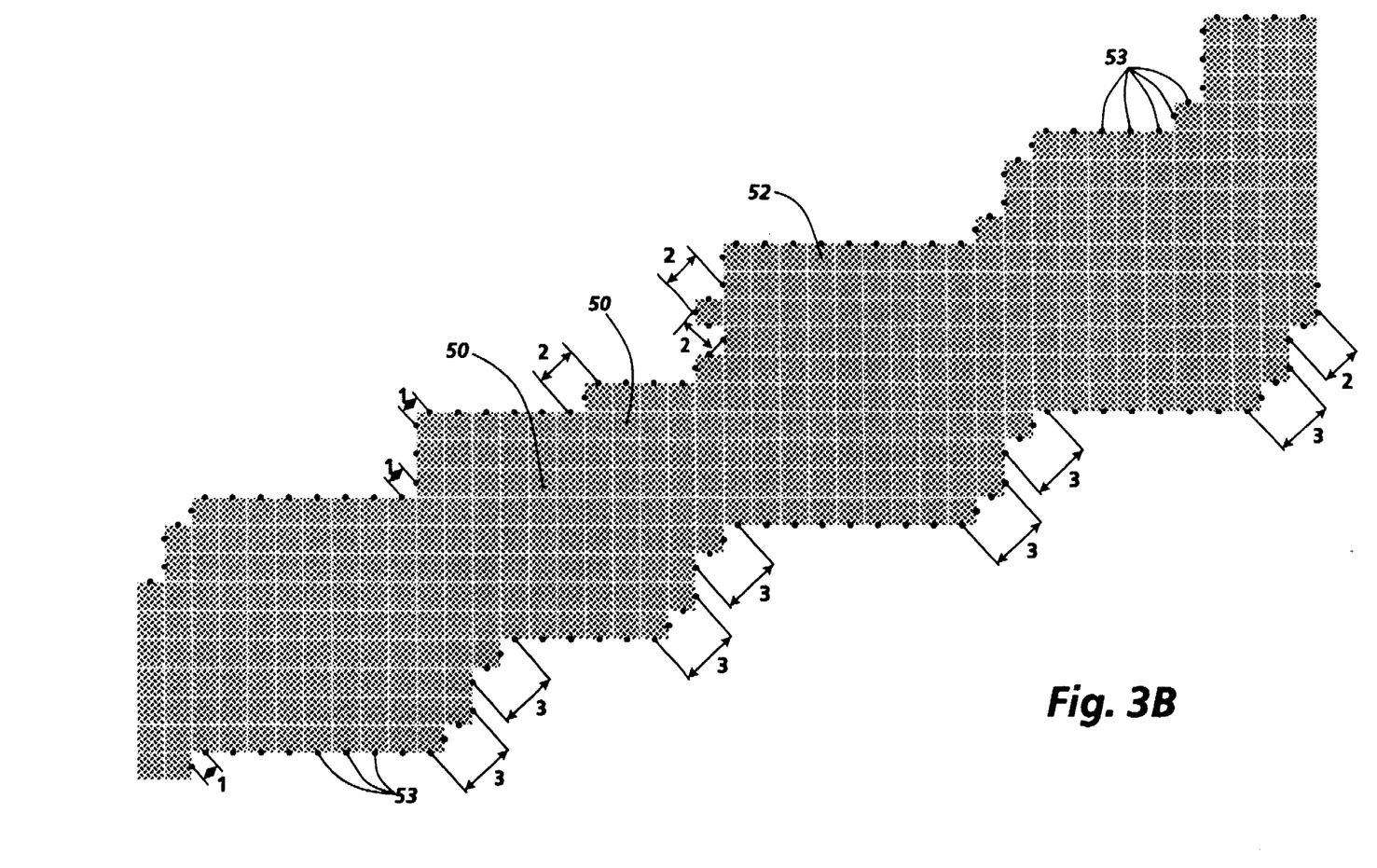
FIG. 3B is a magnified view of a diagonal line generated by first faxing the original document and then scanning in the fax document at 400 dpi.

The differences in the representation of diagonals can be seen in more detail in FIGS. 3A and 3B. Both figures represent connected components composed of a number of black pixels 50, represented by black crosshatched squares. As used herein, a connected component refers to an image, shape, or character, formed by a number of black pixels that are contiguous within the imaginary grid used to represent images in the selected raster format. Connected component 51 of FIG. 3A is a reproduction of a diagonal line generated by scanning an original document at 400 dpi. Connected component 52 of FIG. 3B is a reproduction of a diagonal line generated by first faxing the original document and then scanning in the fax document at 400 dpi. In other words, connected component 52 has undergone coarse pixel quantization. Connected component 51 is a more satisfactory representation of a diagonal line than connected component 52 because the stair-step change from one row of pixels to the next is more gradual and more consistent. Pixel midpoints 53 along the contours of connected components 51 and 52 aid in the identification of the effects of coarse pixel quantization. Pixel midpoints 53 define many diagonal runs two pixels in length along the contour of connected component 51. In contrast, along the contour of connected component 52 pixel midpoints 53 define many diagonal runs three pixels in length, a number of diagonal runs one pixel in length and a still smaller number of diagonal runs two pixels in length. Thus, a comparison of the number of diagonal runs two pixels in length to the number of diagonal runs three pixels and/or one pixel in length provides a means for identifying the effects of coarse pixel quantization.

C. Recognizing Coarse Pixel Quantization

Figure 4:
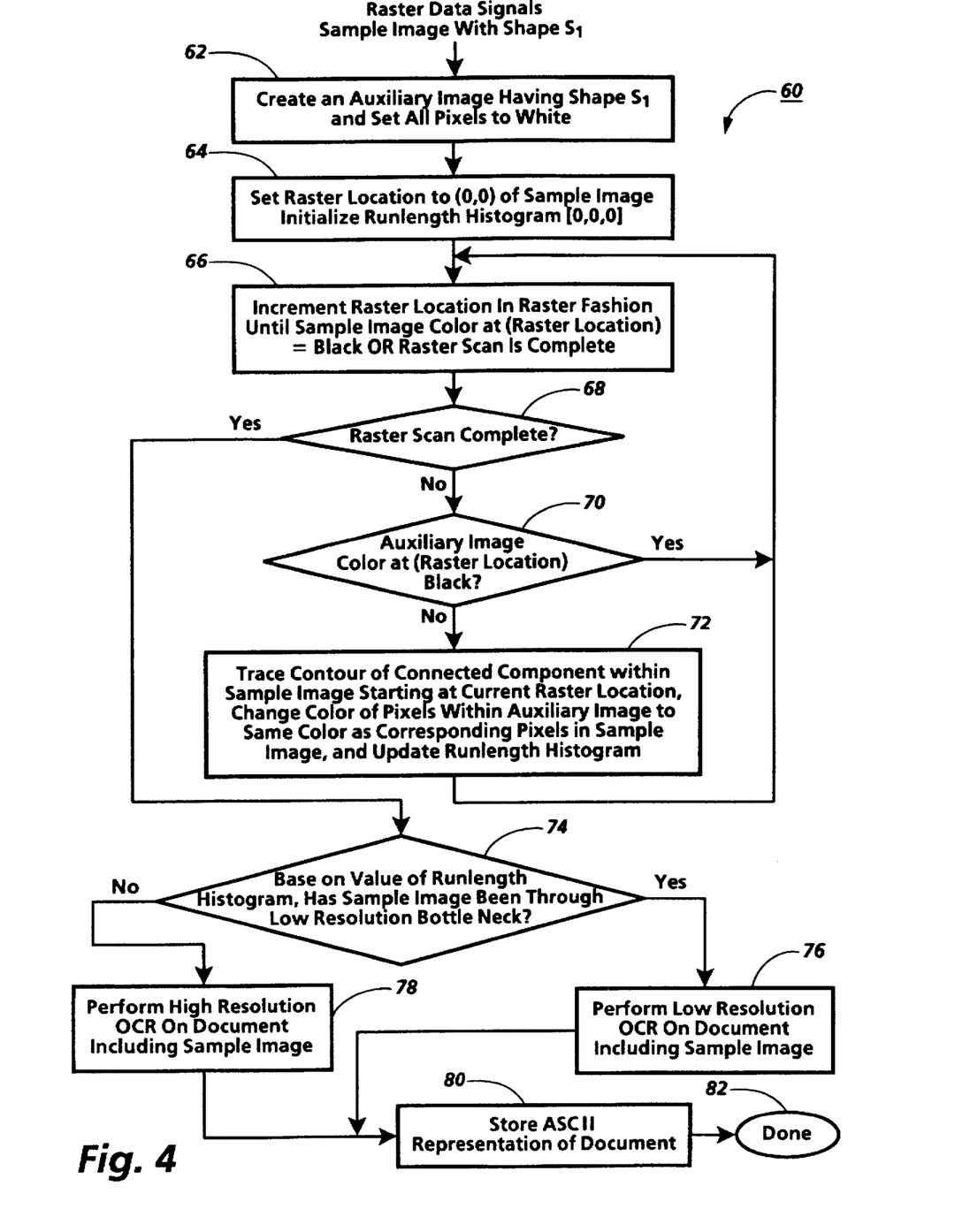
FIG. 4 is a flow diagram of a process for determining whether a document has undergone coarse pixel quantization and selecting the appropriate mode for optical character recognition.

FIG. 4 illustrates in flow diagram form process 60 stored in memory 41 and executed by processor 40 to determine whether document 31 has undergone coarse pixel quantization. Using process 60, processor 40 traces the contours of all connected components within a sample image 32, which forms part of document 31. While tracing the contours of connected components, processor 40 counts the number of diagonal runs of one, two and three pixels in length. By comparing the number of diagonal runs two pixels in length to the number of diagonal runs one pixel and/or three pixels in length processor 40 determines whether document 31 has undergone coarse pixel quantization and fax mode optical character recognition should be selected.

Processor 40 begins execution of process 60 in response to receipt of raster signals representing sample image 32 of document 31. Sample image 32 may contain line art, but sample image 32 preferably includes text. Sample image 32 should contain no halftones. The content of sample image 32 is preferably less than the entire content of document 31 and may be as little as a single paragraph or a few words. In the following description of process 60 it is assumed that the text of document 31 is black on a white background. Process 60 can be modified to handle white text against a black background consistent with the present invention. The location of sample image 32 within document 31 is unimportant. The shape of sample image 32 is unimportant also. Analyzing only sample image 32, as opposed to all of document 31, is preferable because it decreases the total time required to select the appropriate optical character recognition mode and generate character coded signals representative of the textual content of document 31.

Processor 40 advances to step 62 upon receipt of raster signals representative of sample image 32. During steps 62 and 64 processor 40 prepares to trace the contours of connected components within sample image 31. During subsequent steps processor 40 will track the location within sample image 31 being examined using an auxiliary image, which is created during step 62. The shape of the auxiliary image should be identical in shape to that of sample image 31. Processor 40 selects values representative of white for all of the raster locations of the auxiliary image. Processor 40 tracks which raster locations within sample image 31 have been examined by changing the color of pixels within the auxiliary image associated with the same raster location. Processor 40 stores the representation of the auxiliary image in memory 41.

After creating the auxiliary image, processor 40 branches from step 62 to step 64. During step 64, processor 40 initializes the raster location of sample image 32 to be examined to the origin; i.e., (0,0) for a rectangular subimage. Processor 40 also initializes a run length histogram to [0,0,0] during step 64. Processor 40 will use the run length histogram during subsequent steps to track the number of diagonal runs one, two and three pixels in length defined by the contours of connected components within sample image 32. Preparations for contour tracing complete, processor 40 branches to step 66 from step 64.

During step 66 processor 40 begins searching for an edge of a connected component within sample image 32 by examining in a raster fashion each pixel within sample image 32, starting with the current raster location. Processor 40 examines the value of sample image 32 associated with the current raster location and increments the current raster location in raster fashion until a value indicative of a black pixel is discovered. That is not to say processor 40 can examine only one pixel at a time. For efficiency, processor 40 retrieves at one time the pixel values associated with a group of raster locations; i.e., processor 40 may retrieve a byte, a word, or a double-word at a time. By comparing the value of the group of pixels to a value indicative of a group of all white pixels, processor 40 can quickly determine whether any pixel within the group is black. If any pixel within the group is black, processor 40 will examine each pixel of the group individually. Otherwise, processor 40 retrieves the values for another group of pixels. When an edge of a connected component is discovered or every pixel associated with sample image 32 has been examined, processor 40 branches to step 68 from step 66.

Processor 40 determines during steps 68 and 70 whether it should trace the edge of the connected component associated with the current raster location. Processor 40 first determines during step 68 whether every pixel within sample image 32 has been examined. If processor 40 has already examined every pixel forming sample image 32, then there is no need to trace the edge of the connected component associated with the current raster location. That is not the current case; therefore, processor 40 responds by branching to step 70 from step 68. Processor 40 determines during step 70 whether the contour associated with the current raster location has already been traced. Processor 40 makes this determination by examining the value associated by the auxiliary image with the current raster location. If that value represents a white pixel, processor 40 has not yet traced the contour associated with the current raster location. That is the current case so processor 40 advances to step step 72 from step 70.

During step 72 processor 40 traces the contour associated with the current raster location by noting the midpoint between white and black pixels. This varies from previous contour tracing techniques, which identify the centers of pixels defining a contour boundary. The advantage of recording the midpoints between white and black pixels defining a contour is preservation and identification of stair-step changes along a contour, which were previously discussed with respect to connected components 51 and 52 as being indicative of whether characters have undergone coarse pixel quantization. . To illustrate, consider FIG. 5, an illustration of connected component 90 composed of black pixels 92. White pixels are indicated by the white area surrounding connected component 90. The contour of connected component 90 is indicated by pixel midpoints, which are illustrated by black dots, including 94, 96, 98, 100, 102, 104, 106, 108 and 110.

Figure 5:
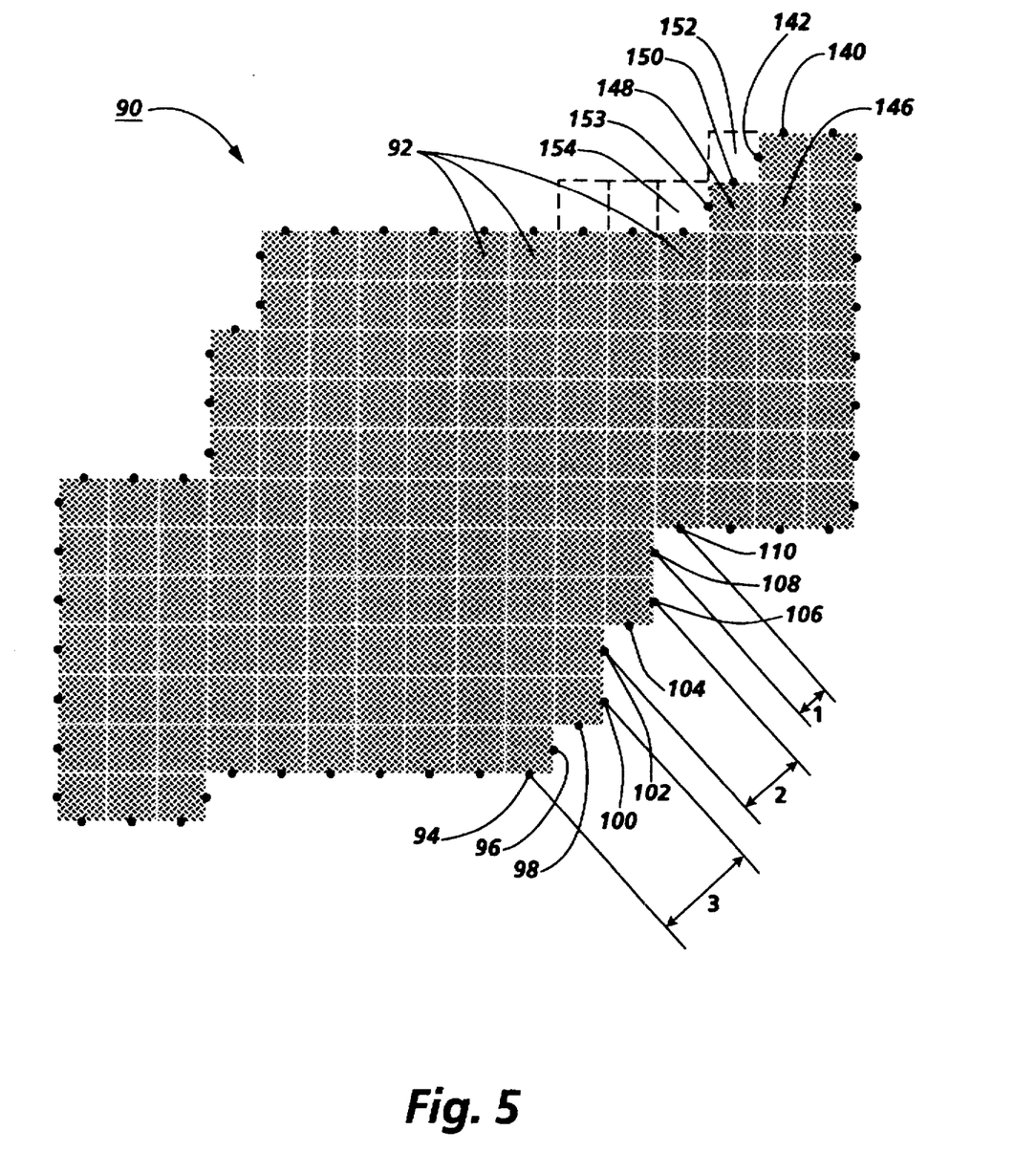
FIG. 5 illustrates a connected component.

While tracing the contour of connected component 90 processor 40 also measures the lengths of contours of connected component 90 in each of the four diagonal directions and records the number of diagonal runs one, two, or three pixels in length. In FIG. 5 pixel midpoints 94, 96, 98, and 100 define a run 3 pixels in length, pixel midpoints 102, 104, and 106 define a run two pixels in length, and midpoints 108 and 110 define a run one pixel in length.

According to process 60, processor 40 recognizes eight directions, or orientations, while tracing a contour: north, south, east, west, northeast, northwest, southeast, and southwest. The dimensions of a contour in north, south, east and west orientations are not of much interest because these orientations do not define diagonal lines. Consequently, only runs oriented to the northeast, northwest, southeast, and southwest are tracked by process 60.

Processor 40 performs one additional task while it traces the contours of a connected component during step 72. Processor 40 changes to black the color associated with the current raster location by the auxiliary image. Processor 40 continues tracing the contour of a connected component within sample image 32 until processor 40 discovers that the pixel location matches the starting location recorded in step 120. Processor 40 responds to that discovery by branching from step 72 to step 66.

Processor 40 repeatedly executes steps 66, 68, 70, and 72 until the contour of every connected component within sample image 32 has been traced. When every contour has been traced, processor 40 branches from step 68 to step 74.

During step 74 processor 40 examines the information it gathered previously to determine whether document 31 has undergone coarse pixel quantization. In one embodiment, processor 40 makes this decision simply by taking the values of the run length histogram and comparing the number of diagonal runs 2 pixels in length to the number of diagonal runs 1 and/or 3 pixels in length. If the number of diagonal runs 2 pixels in length is not greater than the number of diagonal runs 1 and/or 3 pixels in length, then document 31 has probably undergone coarse pixel quantization. Preferably, processor 40 makes its prediction whether document 31 has undergone coarse pixel quantization by calculating a statistic, denoted S, using the run length histogram and comparing the value of S to a threshold value, T. Preferably, $$S = 2r_2 - r_1 - r_3;$$

where:

$r_1$ represents the number of diagonal runs 1 pixel in length;

$r_2$ represents the number of diagonal runs 2 pixels in length; and $r_3$ represents the number of diagonal runs 3 pixels in length.

Without scaling S generally will not be a whole number. Scaling S by some factor to ensure that it is a whole number reduces the time required to execute process 60 by eliminating the need to handle floating point numbers. Ensuring that S is not a floating point number also improves the portability of process 60 by eliminating compatibility problems caused by the different manner in which different platforms handle floating point operations.

Figure 6:
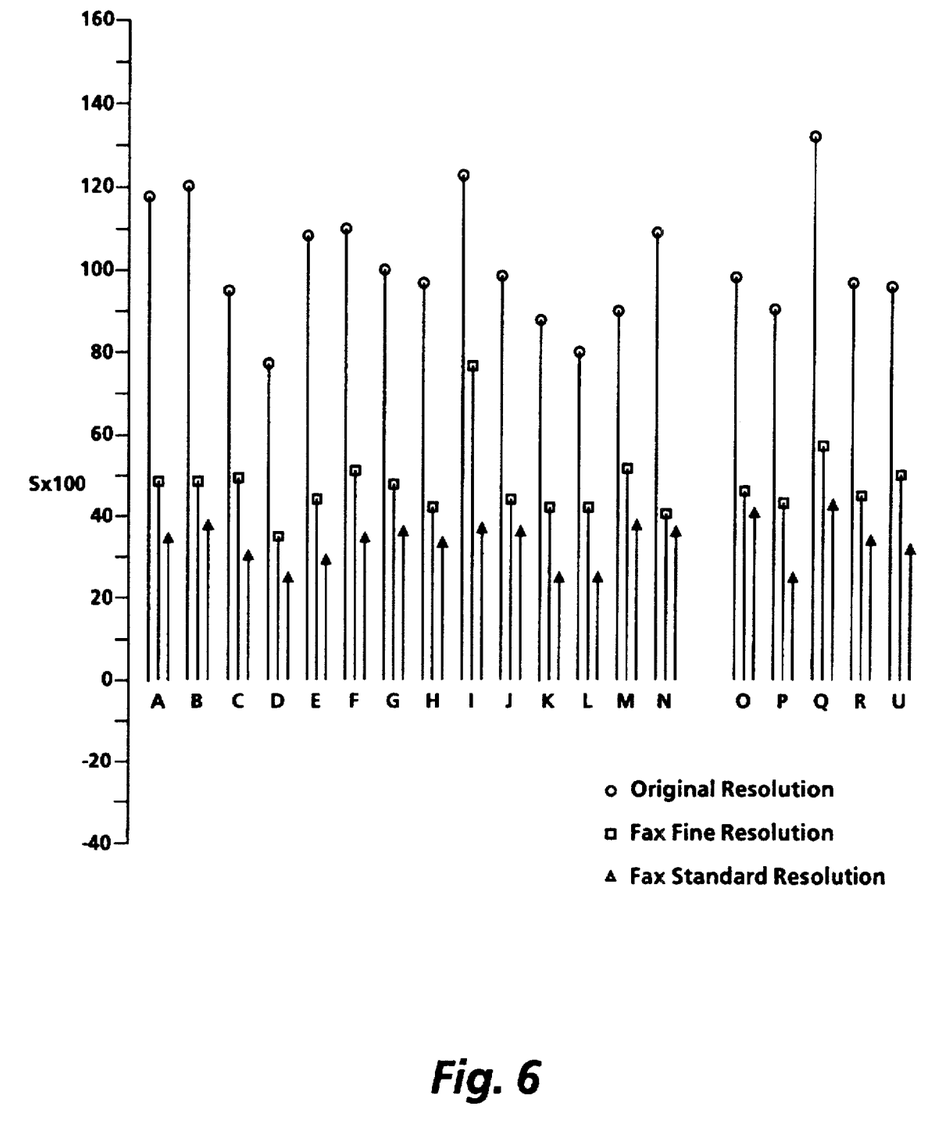
FIG. 6 graphs scaled S values for three versions of a set of documents.

After calculating S, processor 40 compares S to T. The value of T is preferably chosen by calculating S for a number of documents, some of which have undergone coarse pixel quantization and some that have not. By examining the range of values of S generated for both sets of documents, a user of process 60 will be able to select a value for T that distinguishes between documents that have undergone coarse pixel quantization and documents that have not. For example, FIG. 6 graphs S values scaled by 100 for documents designated A through R and U. A value of S was generated for three versions of each document, a high resolution version, a version that undergone fax transmission at high resolution and a third version that underwent fax transmission at standard fax resolution. FIG. 6 shows that for each document the scaled S value generated for the unfaxed version of each document is greater than that generated for either faxed version of the same document. According to FIG. 6, when scaling S by 100 any value of T between 60 and 75 will enable distinction between documents that have undergone coarse pixel quantization and those that have not.

Processor 40 decides that document 31 has undergone coarse pixel quantization if the scaled value of S is less than T. In that case, processor 40 branches to step 76 from step 74. During step 78, processor 40 enables operation of fax mode recognition unit 38. Fax mode recognition unit 38 compares the characters of document 31 represented by raster signals to properties representative of characters that have undergone coarse pixel quantization to generate character recognition signals. On the other hand, if the scaled value of S exceeds T, then processor 40 believes that document 31 has not undergone coarse pixel quantization. In response, processor 40 branches to step 78 from step 74. During step 78 processor 40 enables operation of normal optical character recognition unit 36, which uses character properties appropriate for high resolution characters to generate character recognition signals. Whichever recognition unit 36 or 38 generates the character recognition signals, those signals are coupled to output circuit 39, which generates character coded signals representative of the characters recognized.

Processor 40 performs its last task of process 60 after it receives the character coded signals representative of the textual content of document 31. During step 80 processor 40 stores in memory memory 41, or to some machine readable media within disk drive 44, for later use the character coded signals generated by optical character recognition unit 33.

D. Contour Tracing

Figure 7:
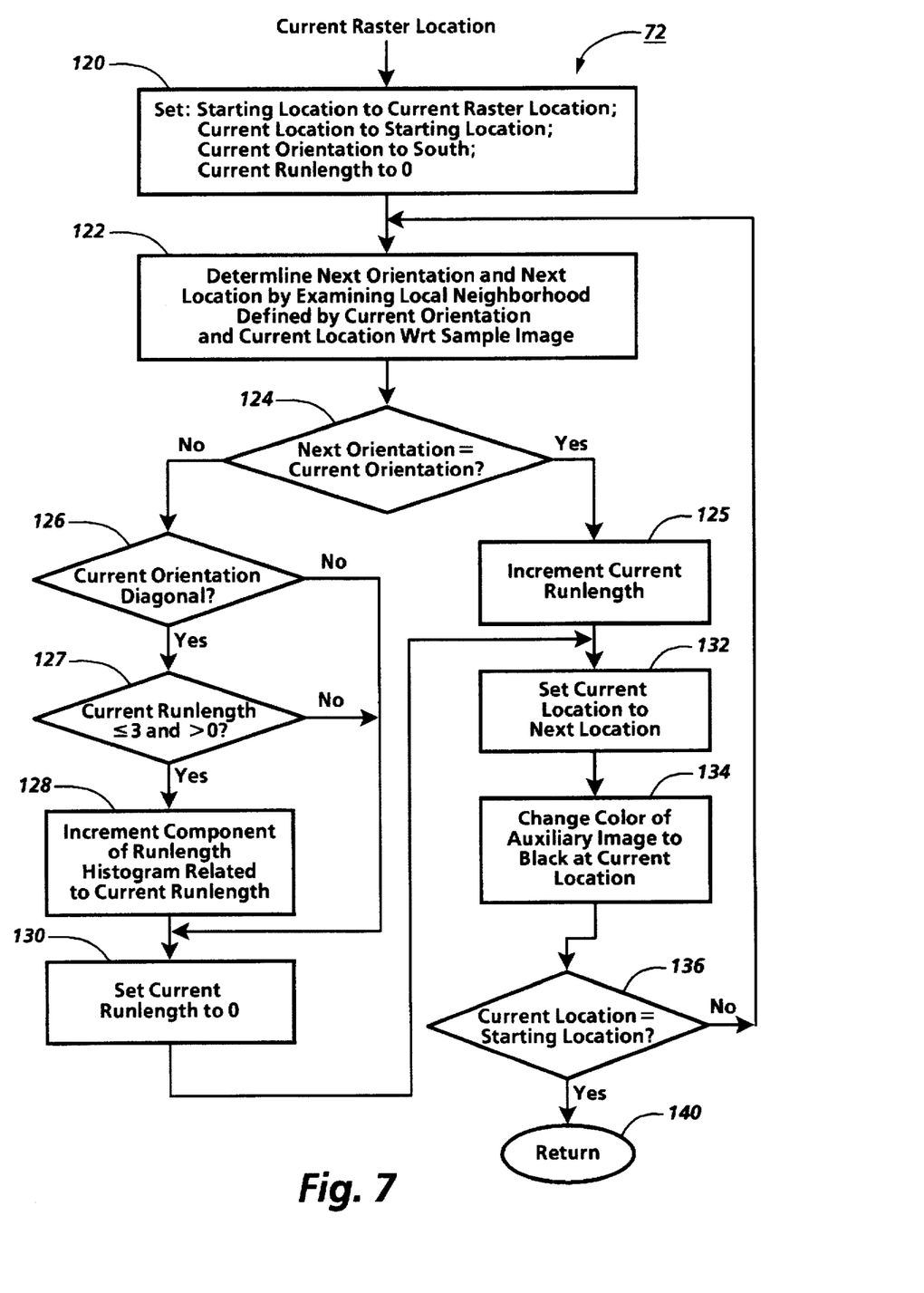
FIG. 7 is a flow diagram of a process for tracing the contour of a connected component and determining the number of diagonal runs one, two, and three pixels in length.

Tracing the contours of connected components within sample image 32 is essential to determining whether or not document 31 has undergone coarse pixel quantization. Thus far discussion of contour tracing during step 72 has focused on the tasks to be accomplished, not how those tasks may be performed. FIG. 7 illustrates in flow diagram form one method of performing the contour tracing tasks of step 72. Processor 40 begins execution of process 72 with some initial preparations for the task to follow. During step 120 processor 40 initializes variables that will be used while tracing the contour of the connected component associated with the current raster location. Three variables are used to determine where processor 40 has been been, where it is, and where it should go along a contour. Starting location indicates the raster location of the point at which processor 40 begins tracing a connected component. Current location indicates the current raster location of the sample image being examined. Current orientation indicates the direction in which processor 40 is currently moving along a contour. During step 120, processor 40 sets the starting location equal to the current raster location, sets the current location equal to the starting location, and sets the current orientation to south.

Processor 40 advances to step 122 from step 120. Processor 40 determines during step 122 where it should move along the contour given the current orientation and current location. The current location and current orientation define a local neighborhood on the contour that includes the next location and defines the next orientation. To illustrate, consider again connected component 90 of FIG. 5. Assume that pixel 140 is the starting location. Because pixel 140 was selected as the starting position by scanning in raster fashion until a black pixel was located, processor 40 knows that the left edge of pixel 140 forms part of the contour that is to be traced. That is to say, midpoint 142 represents the location on pixel 140 from which processor 40 needs to move. The next location must be a pixel midpoint between a black pixel and a white pixel. Moving one pixel length to the south of pixel midpoint 142 would make the next location the midpoint between pixels 146 and 148, both of which are black. As a consequence, the next location cannot be pixel 146, nor can the next orientation be south. Moving one pixel length to the southwest of midpoint 142 would make the next location the pixel midpoint between pixel 148, which is black, and pixel 152, which is white. Thus, pixel midpoint 150 of pixel 148 represents an acceptable next location given that southwest is the next orientation. Accordingly, processor 40 sets the next location to pixel 148 and sets the next orientation to southwest. Afterward, processor 40 advances to step 124 from step 122.

Processor 40 determines whether moving to the next location from the current location will end or continue the current run along the contour. The current run ends if the next orientation is not the same as the current orientation. Comparing the two orientations, south to southwest, processor 40 discovers that it has completed the tracing of one run along the contour. Processor 40 responds by branching to step 126 from step 124.

Having reached the end of a run along the contour of connected component 90, processor 40 now determines whether that run is a type indicative of the type of pixel quantization document 31 has undergone. That determination requires examining two characteristics of the current run. First, during step 126 processor 40 evaluates the current orientation to determine whether the current run is a diagonal run. Only diagonal runs are of interest to process 72. Discovery that the current orientation is north, south, east, or west causes processor 40 to branch from step 126 to step 130. On the other hand, if the current orientation is northeast, northwest, southeast or southwest, the current run may be one of interest, so processor 40 branches to step 127 to continue its evaluation. During step 127, processor 40 determines whether the just ended run was one, two, or three pixels in length. If so, processor 40 branches to step 128 from step 126 and updates the appropriate variable of the run length histogram. That done processor 40 advances to step 130 from step 128. Processor 40 advances directly to step 130 from step 126 when the length of the run just traced along the contour is less than 1 pixel in length or greater than three pixels in length, as is the current case. During step 130, processor 40 prepares to trace a new run along the contour by setting the value of the current run length to zero. That done, processor 40 advances to step 132 from step 130.

Processor 40 changes the current location to the next location during step 132 by setting the current location equal to the next location. To reflect its examination of that location, during step 134 processor 40 changes to black the color of the auxiliary image associated with the current location. Processor 40 then advances to step 136 from step 134.

During step 136 processor 40 determines whether it has completely traced the contour of the connected component by comparing the current location to the starting location. If the two locations are not identical, processor 40 has not yet completely traced the contour. When that is the case, processor 40 returns to step 122 from step 134 to select for examination the next pixel along the contour of connected component 90.

The task facing processor 40 upon its return to step 122 is what should the next location and next orientation be given the current location is pixel 148 and the current orientation is southwest. By continuing to trace in a southwest orientation from the current location, midpoint 150, the next location would be pixel midpoint 153, which is located between black pixel 148 and white pixel 154, as required. Thus, processor 40 sets the next location to pixel 148 and the next orientation to southwest. Processor 40 then branches to step 124 from step 122.

As before, during step 124 processor 40 determines whether movement to the next location will end the tracing of a run along the contour of connected component 90. Processor 40 discovers that is not the current case because the next orientation, southwest, is the same as the current orientation. In response, processor 40 advances to step 125 and increments the length of the current run by one. That done, processor 40 advances to step 132 and executes steps 132, 134 and 136 in the manner previously discussed. Processor 40 will continue executing process 72 until it has completely traced the contour of a connected component. When that occurs, processor 40 exits step 136 and advances to step 138, where control of processor 40 returns to process 60.

E. Conclusion

Thus, the foregoing specification has described a method and apparatus for identifying documents that have undergone coarse pixel quantization. This method enables selecting between two types of optical character recognition—normal mode and fax mode. According to the method, the contours of connected components within a sample area are traced and the number of diagonal runs one, two and three pixels in length are counted and used to generate a statistic. The value of this statistic is then compared to a threshold value to determine whether the document has undergone coarse pixel quantization.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A method of selecting an optical character recognition mode to be applied to a document using a processor coupled to a memory storing instructions for performing the method, the document being represented by raster signals representative of pixels, the document including a sample image including a multiplicity of connected components represented by a multiplicity of pixels of a first color and surrounded by pixels of a second color, midpoints between the pixels of the first color of a connected component and adjacent pixels of the second color defining a contour, optical character recognition modes including a fax mode and a normal mode, the method comprising the processor implemented steps of:

a) measuring the contours of the connected components of the sample image to determine whether the document has undergone coarse pixel quantization; and b) if the sample image has undergone coarse pixel quantization, selecting the fax mode to generate a multiplicity of character coded signals representing the document from the raster signals.

2. The method of claim 1 wherein step a) comprises 1) determining a first number of diagonal runs 1 pixel or 3 pixels in length defined by the contours of the connected components; and 2) determining a second number of diagonal runs 2 pixels in length defined by the contours of the connected components.

3. The method of claim 2 wherein the document is determined to have undergone coarse pixel quantization if the second number is less than the first number.

4. The method of claim 3 further comprising the step of:

c) selecting the normal mode to generate the multiplicity of character coded signals representing the document from the raster signals if it is determined that the sample image has not undergone coarse pixel quantization because the second number is greater than the first number.

5. The method of claim 1 wherein step a) comprises:

1) determining a first number of diagonal runs 3 pixels in length defined by the contours of the connected components; and 2) determining a second number of diagonal runs 2 pixels in length defined by the contours of the connected components.

6. The method of claim 5 wherein the document is determined to have undergone coarse pixel quantization if the second number is less than the first number.

7. The method of claim 6 further comprising the step of:

c) selecting the normal mode to generate the multiplicity of character coded signals representing the document from the raster signals if it is determined that the sample image has not undergone coarse pixel quantization because the second number is greater than the first number.

8. The method of claim 1 wherein step a) comprises:

1) determining a first number of diagonal runs 1 pixel in length defined by the contours of the connected components;

2) determining a second number of diagonal runs 2 pixels in length defined by the contours of the connected components; and 3) determining a third number of diagonal runs 3 pixels in length defined by the contours of the connected components.

9. The method of claim 8 wherein the document is determined to have undergone coarse pixel quantization if the second number is less than a sum of the first number and the third number.

10. The method of claim 9 further comprising the step of:

c) selecting the normal mode to generate the multiplicity of character coded signals representing the document from the raster signals if it is determined that the sample image has not undergone coarse pixel quantization because the second number is greater than the sum of the first number and the third number.

11. The method of claim 8 wherein the document is determined to have undergone coarse pixel quantization if twice the second number minus a sum of the first number and the third number is less than a threshold value.

12. The method of claim 11 further comprising the step of:

c) selecting the normal mode to generate the multiplicity of character coded signals representing the document from the raster signals if it is determined that the sample image has not undergone coarse pixel quantization because the threshold value is greater than twice the second number minus the sum of the first number and the second number.

13. A method of selecting an optical character recognition mode to be applied to a document using a processor coupled to a memory storing instructions for performing the method, the document being represented by raster signals representing a multiplicity of raster locations, each raster location having an associated pixel, each pixel having an associated color, the document including a sample image having a shape and represented by a subset of the raster signals representing a subset of the raster locations, the subset of raster signals representing a subset of the multiplicity of raster locations, the sample image including a multiplicity of connected components defined by pixels of a first color, the connected components being surrounded by pixels of a second color, midpoints between the pixels of the first color of each connected component and adjacent pixels of the second color defining a contour, optical character recognition modes including a fax mode and a normal mode, the method comprising the processor implemented steps of:

a) creating an auxiliary image having a same shape as the shape of the sample image, the auxiliary image being associated with the subset of raster locations, each pixel of the auxiliary image being set to the second color;

b) examining the sample raster signals until a pixel of the first color is discovered at a first raster location;

c) if the auxiliary image associates a pixel of the second color with the first raster location:
  1) tracing the contour of a connected component including the first raster location to count a first number of diagonal runs 1 pixel in length, a second number of diagonal runs 2 pixels in length, and a third number of diagonal runs 3 pixels in length along the contour;
  2) changing to the first color pixels of the auxiliary image that correspond to raster locations forming the contour of the connected component;

d) repeating steps b) and c) until each raster location of the sample image has been examined;

e) determining whether the sample image has undergone coarse pixel quantization by comparing the second number to the first number and the third number; and f) selecting the fax mode to generate a multiplicity of character coded signals representing the document from the raster data signals if the sample image has undergone coarse pixel quantization.

14. The method of claim 13 wherein the document is determined to have undergone coarse pixel quantization if the second number is less than a sum of the first number and the third number.

15. The method of claim 14 further comprising the step of:

c) selecting the normal mode to generate the multiplicity of ASCII signals representing the document from the raster signals if it is determined that the sample image has not undergone coarse pixel quantization because the second number is greater than the sum of the first number and the third number.

16. The method of claim 13 wherein the document is determined to have undergone coarse pixel quantization if twice the second number minus a sum of the first number and the third number is less than a threshold value.

17. The method of claim 16 further comprising the step of:

c) selecting the normal mode to generate the multiplicity of ASCII signals representing the document from the raster signals if it is determined that the sample image has not undergone coarse pixel quantization.

18. An optical character recognition device comprising:

a) a normal recognition unit for optically recognizing characters that have not undergone course pixel quantization included within a document represented by raster signals, the normal recognition unit generating character recognition signals when a mode signal is in a first state;

b) a fax mode recognition unit for optically recognizing characters that have undergone coarse pixel quantization included in the document represented by the raster signals, the fax mode recognition unit generating the character recognition signals when the mode signal is in a second state;

c) an output unit for generating character coded signals in response to the character recognition signals;

d) a mode selector for generating the mode signal in response to a subset of the raster signals, the subset of the raster signals representing a sample image of the document, the sample image including a subset of the characters, the mode selector bringing the mode signal to the first state if analysis of the subset of the raster signals indicates that the subset of characters have undergone coarse pixel quantization, the mode selector bringing the mode signal to the second state if analysis of the subset of raster signals indicates that the subset of characters has not undergone coarse pixel quantization.

19. The optical recognition unit of claim 18 wherein the mode selector comprises:

d1) a processor for executing instructions for determining whether the subset of characters have undergone coarse pixel quantization; and d2) a memory coupled to the processor for storing the instructions.

\* \* \* \* \*